United States Patent [19]

Onodera

[11] 4,423,706

[45] Jan. 3, 1984

[54] INTAKE SYSTEM OF ENGINES

[75] Inventor: Hiroki Onodera, Iwata, Japan

[73] Assignee: Yamaha Motor Co., Ltd., Japan

[21] Appl. No.: 277,326

[22] Filed: Jun. 25, 1981

[30] Foreign Application Priority Data

Jun. 28, 1980 [JP] Japan .................................. 55-88068

[51] Int. Cl.³ ............................................ F02M 35/00
[52] U.S. Cl. ............................. 123/52 M; 123/52 MB
[58] Field of Search ............... 123/52 M, 396, 52 MB, 123/52 MF

[56] References Cited

U.S. PATENT DOCUMENTS 4,254,746  3/1981  Chiba et al. ...................... 123/52 M

FOREIGN PATENT DOCUMENTS

| 2731392 | 1/1979 | Fed. Rep. of Germany ........ 123/52 MF |
| 2378183 | 8/1978 | France ............................ 123/52 MB |
| 55-63918 | 5/1980 | Japan .................................... 123/396 |
| 498407 | 1/1976 | U.S.S.R. ........................... 123/52 M |

Primary Examiner—Craig R. Feinberg
Attorney, Agent, or Firm—Ernest A. Beutler

[57] ABSTRACT

Several embodiments of induction systems for internal combustion engines that improve charging efficiency, particularly at low speeds. In each embodiment, a plenum chamber is provided that communicates with the induction system between the throttle valve and the chamber of the engine which is being served. A control valve is positioned in the line of communication of the plenum chamber with the intake passage and is operated so as to close when the throttle valve is in its idle position an open when the throttle valve moves to an off idle position.

10 Claims, 5 Drawing Figures

INTAKE SYSTEM OF ENGINES

BACKGROUND OF THE INVENTION

This invention relates to an intake system for engines and more particularly to an intake system that improves the running of the engine at idle and low speed.

It is a well known characteristic of internal combustion engines that performance at idle and low speeds is not particularly good. One reason for this poor low speed running is the difficulty in obtaining good engine charging at these speeds, particularly when the throttle valve is only partially opened. As is well known, each time the engine completes its intake stroke, be it two or four cycle, the intake charge stops flowing in the induction system and the inertia of the charge must be overcome when the engine next begins its intake stroke. This problem, although common to two and four cycle type of engines, is more prominent with a two cycle type of engine. It has recently been found that the charging efficiency of the engine may be improved by providing a plenum chamber that communicates with the induction system between the throttle valve and the chamber which is served. Such a plenum chamber is subjected to a negative pressure during the intake stroke which is maintained at the completion of the intake cycle so as to promote continuing air flow from the induction system into the plenum chamber even when the engine is not undergoing an intake stroke. This has been found to significantly improve low speed charging efficiency. This problem and several embodiments for solving it are described in more detail in the copending patent application of Noritaka Matsuo, entitled "Intake System For Engine," Ser. No. 163,201, filed June 25, 1980 and assigned to the assignee of this application.

Although the devices shown in that application have been proven to be particularly effective, there may be some running conditions wherein the performance of the engine incorporating such a plenum chamber may deteriorate. For instance, it is suspected that during idling such an arrangement results in a higher noise level than with conventional engines. It is believed that this phenomena results due to the fact that the throttle valve of an engine incorporated with such a plenum chamber can be more fully closed during a given running condition than with a conventional engine. That is, because of the operation of the plenum chamber and the more continuous flow through the intake passage, the throttle valve of the engine need not be opened to as great an extent as with a conventional induction system. As a result of the lesser opening of the throttle valve, it is believed that the rate of combustion at idle with an engine embodying this type of induction system may be somewhat slower than that of a conventional engine. The longer combustion is believed to create a force within the combustion chamber that gives rise to noise during idling.

It is, therefore, a principal object of this invention to provide an improved induction system for an internal combustion engine.

It is another object of the invention to provide an induction system for an internal combustion engine that improves performance particularly at low engine speeds and low throttle openings.

It is another object of the invention to provide an improved induction system of this type which eliminates or minimizes noise associated with the engine.

SUMMARY OF THE INVENTION

This invention is adapted to be embodied in an induction system for a variable volume chamber of an internal combustion engine having an induction passage for supplying the chamber, a throttle valve for controlling the flow through the induction passage, a plenum chamber and means communicating the plenum chamber with the induction passage between the throttle valve and the chamber. In accordance with the invention, means are provided for precluding communication of the plenum chamber with the induction passage when the throttle valve is in its idle position.

DETAILED DESCRIPTION OF THE PREFERRED EMBODIMENTS

Figure 1:
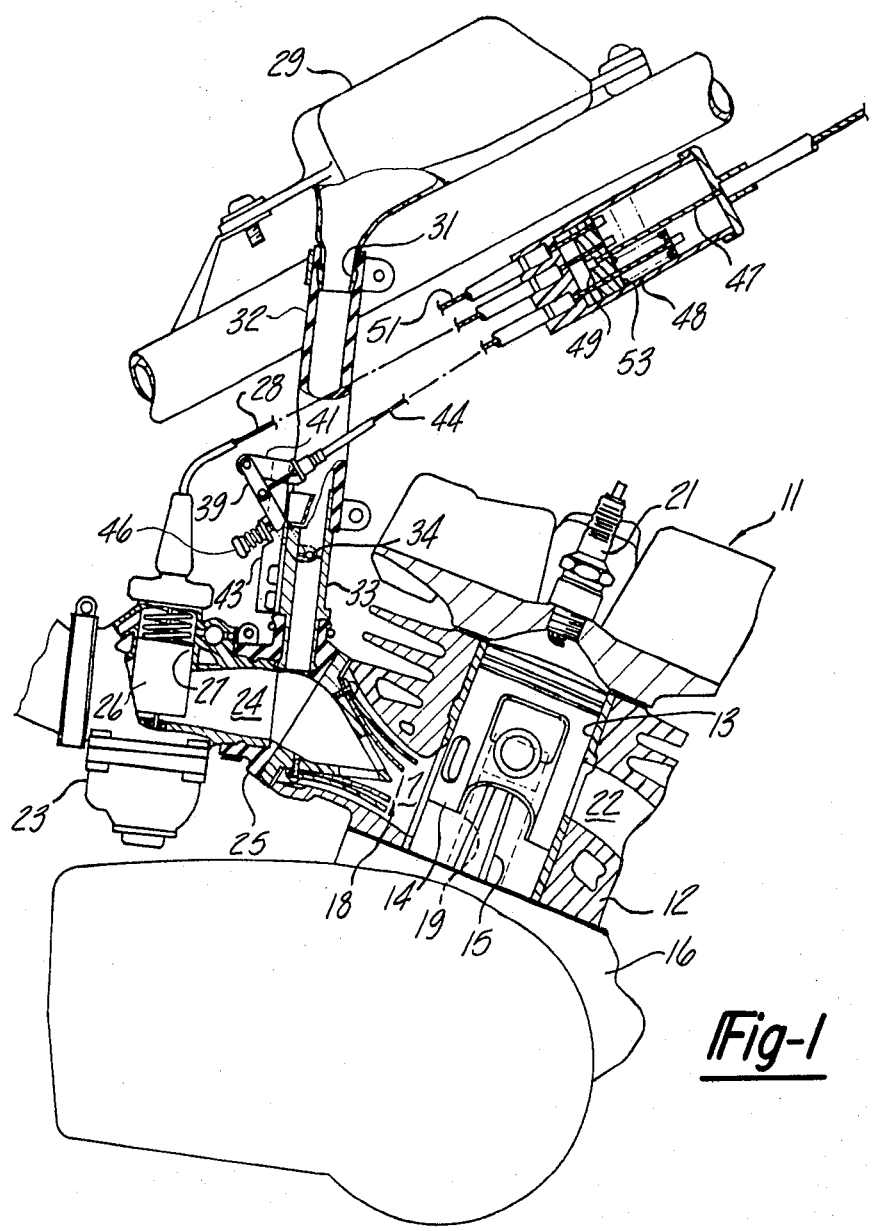
FIG. 1 is a side elevational view, with portions shown in section, of a motorcycle having an engine constructed in accordance with a first embodiment of this invention.

Referring first to the embodiment of FIGS. 1 through 4, a motorcycle engine embodying this invention is identified generally by the reference numeral 11. The engine 11 is of the single cylinder two cycle type. It is to be understood, however, that the invention may be embodied in engines having other numbers of cylinders, engines of the four cycle type, engines having other types of variable volume chambers and engines used to power vehicles or devices other than motorcycles.

The engine 11 includes a cylinder block 12 having a cylinder bore 13 in which a piston 14 reciprocates. The piston 14 is connected by means of a connecting rod 15 to a crankshaft (not shown) which is rotatably supported in a crankcase 16 in a known manner. An intake passage 17 is provided in the cylinder block 12 in communication with the interior of the crankcase 16 when the piston 14 is at an uppermost position. A reed-type check valve 18 is positioned in the intake passage 17 to prevent back-flow of intake gasses when the piston 14 is on its downward movement. During this downward movement, the charge in the crankcase 16 is compressed and is transferred to the combustion chamber of the engine via transfer or scavenge ports 19. When in the combustion chamber, the charge is fired by a spark plug 21 in a known manner. The burnt charge is exhausted to the atmosphere through an exhaust port 22.

A carburetor, indicated generally by the reference numeral 23 is provided for delivering a charge to the intake passage 17. The carburetor 23 has its induction passage 24 in registry with a corresponding passage formed in a spacer 25 that is interposed between the carburetor 23 and the cylinder block intake passage 17. The carburetor 23 also includes a throttle valve 26 of the sliding piston type. The throttle valve 26 is slidably supported in a bore 27 of the body of the carburetor 23 and is actuated by means of a flexible transmitter 28, in a manner to be described.

In order to improve the charging efficiency of the engine 11, particularly at low speeds and with low opening of the throttle valve 26, a plenum chamber 29 is provided that has an opening 31 that communicates by means of a flexible conduit 32 with a pipe 33 that extends from the spacer 25. The pipe is open at its lower end into the induction passage of the spacer 25.

A control valve 34 is positioned in the pipe 33 for controlling the communication of the plenum chamber 29 with the induction system downstream of the throttle valve 26. As will become apparent, the control valve 34 is operated in sequence with the throttle valve 26 so that the control valve 34 will be closed when the throttle valve 26 is in its idle position and will be opened at a non-linear rate as the throttle valve 26 goes to its off idle position.

The control valve 34 is affixed to a control valve shaft 35 (FIGS. 2 and 3) that is rotatably journaled in the pipe 33. A lever 36 is affixed to one end of the control valve shaft 35 and has an outwardly extending pin portion 37 formed integrally with it. The pin portion 37 is received in an elongated slot 38 formed at one end of a lever 39 that is in turn pivotally supported on a bracket 41 and pivot pin 42. The bracket 41 extends outwardly from a main portion 43 that is affixed to the pipe 35.

A flexible transmitter 44 is connected to the lever 39 for rotating the lever and in turn the lever 36 to rotatably position the control valve 34. A torsional spring 45 encircles the control valve shaft 35 and acts upon this shaft to normally bias the control valve 35 to its fully closed position.

Figure 2:
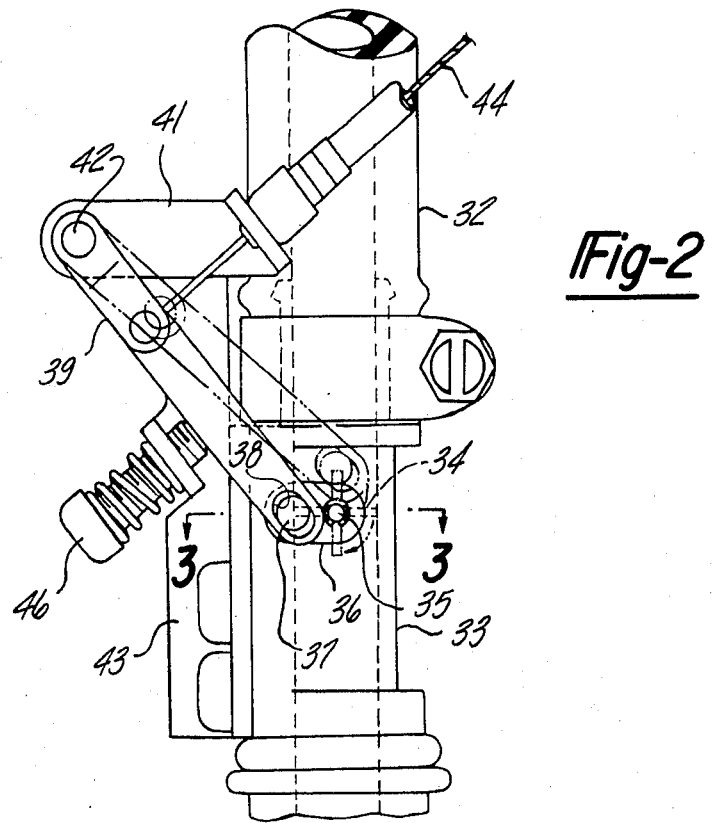
FIG. 2 is an enlarged side elevational view of the actuating mechanism for the control valve of the embodiment of FIG. 1.
Figure 3:
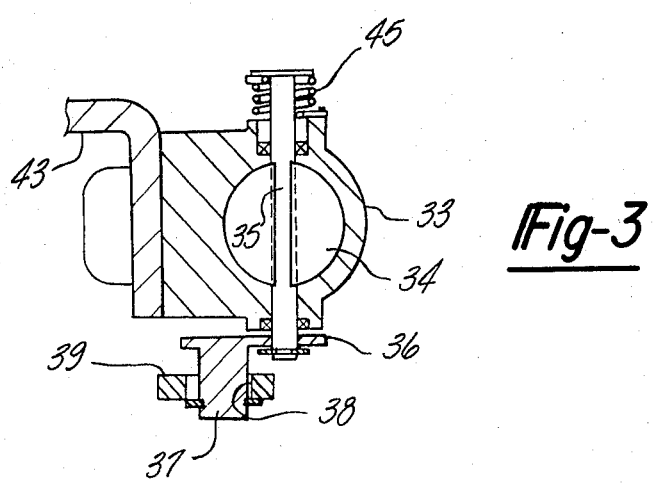
FIG. 3 is a cross-sectional view taken along the line 3—3 of FIG. 2.

The closed position of the control valve 34 is controlled by means of an adjustable stop 46 that is threaded through a portion of the bracket 43 and which is contacted by the lever 39 so as to limit the degree of rotation of the lever 39 in the clockwise direction as viewed in FIG. 2.

Both the throttle valve 26 and control valve 34 are operated by means of an operator control cable 47 that is connected to the handle grip or other throttle control of the associated vehicle. The transmitter 47 extends into a cylindrical element 48 and has its end staked to a sliding piston member 49. The throttle control cable 28 is also staked to the piston 49 so that movement of the control cable 47 will cause simultaneous movement of the throttle control cable 28. An oil pump discharge control cable 51 is also affixed to the piston 49 for simultaneous action with it.

A connection is provided between the piston 49 and control valve actuating cable 44 that causes the control valve 34 to be opened as the throttle valve 26 is opened and which permits continued movement of the throttle valve 26 to its opened position after the control valve 34 has reached its fully opened position. The arrangement between the level 39 and control valve lever 36 is such that the control valve 34 is operated at a faster rate than is the throttle valve 26, as will become apparent. For this purpose, the control valve cable 44 extends through a bore in the piston 49 and has its outer end staked to a fastener element 52. A coil compression spring 53 is loaded between the piston 49 and fastener element 52 so as to permit movement of the element 52 with the piston 49 until the control valve 34 reaches its fully opened position. At this time, the spring 53 will yield and permit the piston 49 to continue to move to open the throttle valve 26 to its fully opened position without further movement of the control valve 34.

Figure 4:
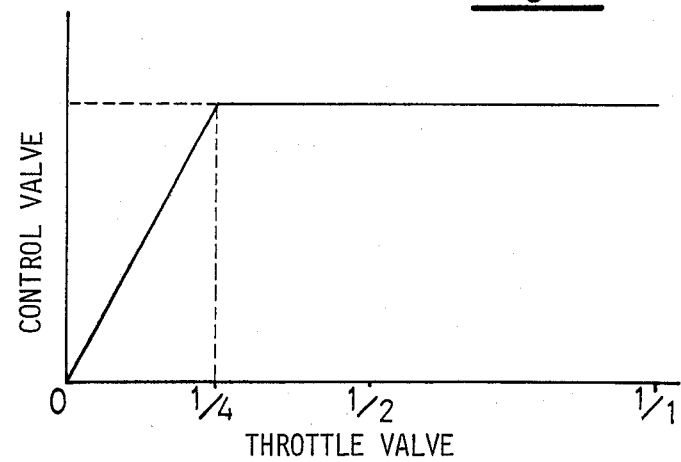
FIG. 4 is a graphical view showing the degree of opening of the control valve on the ordinate with relation to the opening of the throttle valve on the abscissa.

The relationship of opening movement of the throttle valve 26 to the control valve 34 is shown in FIG. 4 wherein the movement of the control valve is shown on the abscissa and the movement of the throttle valve 26 is shown on the ordinate. As will be noted, both valves 26 and 34 are in their closed or idle positions simultaneously. As the control cable 47 is drawn upwardly, the piston 49 will move and the cables 51, 28 and 44 will be moved simultaneously. The spring 53 is stiffer than the control valve return spring 45 so that the control valve will begin to open at the same time the throttle valve 26 is opened. Because of the geometry of the lever 39, lever 36, pin 37 and slot 38, the control valve 34 will be opened more rapidly than will the throttle valve 26. In a preferred embodiment of the invention, the relationship is such that the control valve 34 will reach its fully opened position when the throttle valve 26 is approximately at its one-quarter opened position. Therefore, the operation of the plenum chamber 29 will have its maximum effect on the induction system at this opening of the throttle valve 26 and this effect will continue on through the remainder of the opening of the throttle valve 26.

When the control cable 47 is moved in a direction to cause closure of the throttle valve 26, the throttle valve 26 will continue to move toward its closed position while the control valve 34 is held in its fully opened position because of the action of the spring 53 until the throttle valve 26 reaches its one-quarter opened position. At this time, the spring 53 will have expanded and the control valve return spring 45 can move the control valve 34 toward its closed position.

Figure 5:
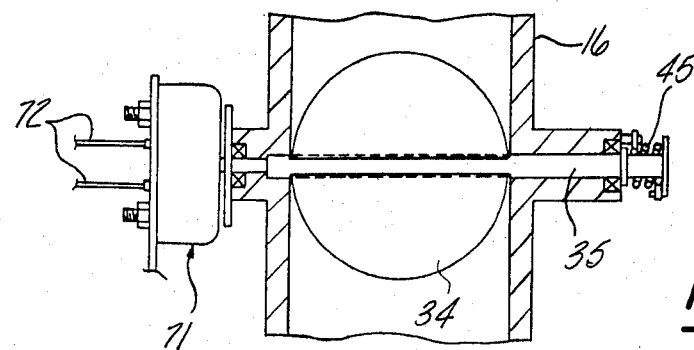
FIG. 5 is a cross-sectional view showing the control valve constructed in accordance with another embodiment of the invention.

Another embodiment of the invention is illustrated in FIG. 5. With this embodiment, the only difference from the embodiment previously described is the manner for operating the control valve. For that reason, only that portion of the construction has been illustrated and those components which are the same as in the previously described embodiment are identified by the same reference numerals and their description will not be repeated. In accordance with this embodiment, an electric solenoid 71 has its output connected to the control valve shaft 35 and is provided with a pair of leads 72 which place it in circuit with the vehicle battery and with a device that senses engine speed. When the sensing device indicates that the engine speed is above the idle speed, the circuit to the solenoid 71 is completed and the control valve 34 is opened. This degree of opening may be varied in relation to the actual engine speed so as to achieve the same type of opening as the linkage system in the previously described embodiment.

In addition to the mechanical and electrical systems for operating the control valve of the previously described embodiments, it should also be apparent to those skilled in the art that the control valve 34 may be operated by means of a vacuum motor which senses intake manifold vacuum downstream of the throttle valve 26. With such a device, the vacuum motor can be set to actuate the control valve when the induction system vacuum falls below that normally experienced at idle. Again, the degree of opening of the control valve 34 may be adjusted through suitable diaphragm motors so as to follow an opening curve as shown in FIG. 4.

Although a number of embodiments have been disclosed and described, various other modifications and changes may suggest themselves to those skilled in the art without departing from the spirit and scope of the invention, as defined by the appended claims.

What is claimed is:

1. An induction system for a variable volume chamber of an internal combustion engine having an induction passage for supplying intake charge to said chamber, a throttle valve for controlling the flow through said induction passage, a plenum chamber, means for communicating said plenum chamber with said induction passage only between said throttle valve and said chamber, said communicating means and said plenum chamber providing for flow of a portion of said intake charge from said induction passage into said plenum chamber during a portion of the engine operating cycle and providing flow from said plenum chamber to said induction passage of at least a part of said portion of said intake charge during at least a part of the induction cycle of said engine for supplementing the flow in said induction passage, and means for precluding communication of said plenum chamber with said induction passage when said throttle valve is in its idle position comprising a control valve means operatively connected with said throttle valve and movable from a closed position when said throttle valve is in its idle position to an opened position when said throttle valve is moved from its idle position.

2. In an induction system as set forth in claim 1 further including check valve means interposed in the induction passage between the chamber and the portion of the induction passage that communicates with the plenum chamber for preventing reverse flow from the chamber to said induction passage.

3. In an induction system as set forth in claim 1 wherein the control valve means for precluding communication of the plenum chamber with the induction passage comprises a control valve interposed between said plenum chamber and said induction passage.

4. In an induction system as set forth in claim 3 further including means for opening the control valve at a rate that is not linearly related to the degree of opening of the throttle valve.

5. In an induction system as set forth in claim 4 further including check valve means interposed in the induction passage between the chamber and the portion of the induction passage that communicates with the plenum chamber for preventing reverse flow from the chamber to said induction passage.

6. In an induction system as set forth in claim 3 further including means for opening the control valve to its fully opened position before the throttle valve is in its fully opened position.

7. In an induction system as set forth in claim 6 further including means for opening the control valve at a rate that is not linearly related to the degree of opening of the throttle valve.

8. In an induction system as set forth in claim 3 further including linkage means interconnecting the throttle valve and the control valve for closing the control valve upon movement of the throttle valve.

9. In an induction system as set forth in claim 8 further including lost motion means for permitting continued opening of the throttle valve once the control valve reaches its fully opened position.

10. In an induction system as set forth in claim 8 further including check valve means interposed in the induction passage between the chamber and the portion of the induction passage that communicates with the plenum chamber for preventing reverse flow from the chamber to said induction passage.

* * * * *